US011454499B2

(12) United States Patent
Lippuner et al.

(10) Patent No.: US 11,454,499 B2
(45) Date of Patent: Sep. 27, 2022

(54) MEASUREMENT METHOD FOR A SURFACE-MEASURING MEASURING MACHINE

(75) Inventors: Heinz Lippuner, Rebstein (CH); Urs Vokinger, Au (CH); Knut Siercks, Mörschwil (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 956 days.

(21) Appl. No.: 13/636,628

(22) PCT Filed: Mar. 21, 2011

(86) PCT No.: PCT/EP2011/054192
§ 371 (c)(1),
(2), (4) Date: Nov. 8, 2012

(87) PCT Pub. No.: WO2011/117171
PCT Pub. Date: Sep. 29, 2011

(65) Prior Publication Data
US 2013/0132026 A1    May 23, 2013

(30) Foreign Application Priority Data
Mar. 26, 2010    (EP) .................................... 10157931

(51) Int. Cl.
*G01C 1/00* (2006.01)
*G01B 21/04* (2006.01)
*G01D 5/347* (2006.01)

(52) U.S. Cl.
CPC ............. *G01C 1/00* (2013.01); *G01B 21/045* (2013.01); *G01D 5/3473* (2013.01)

(58) Field of Classification Search
CPC ........ G01C 1/00; G01B 21/045; G01D 5/3473
See application file for complete search history.

(56) References Cited

U.S. PATENT DOCUMENTS 4,668,862 A     5/1987   Waibel
4,947,166 A  *  8/1990   Wingate ............... G01D 5/2497
                                                        341/13

(Continued)

FOREIGN PATENT DOCUMENTS

CH          658514 A5    11/1986
CN      101556137 A      10/2009

(Continued)

OTHER PUBLICATIONS

European Search Report dated Jul. 27, 2010 as received in application No. EP 10 15 7931.

*Primary Examiner* — Manuel L Barbee
(74) *Attorney, Agent, or Firm* — Maschoff Brennan (57) ABSTRACT

Measurement method where a code projection which is dependent on a three-dimensional position of a code carrier relative to a sensor arrangement is generated on a sensor arrangement, and at least part of the code projection is captured. An angular position of the code carrier with reference to the defined axis of rotation is ascertained and a current measurement position of the measurement component relative to a base is determined, wherein, a position value for at least one further degree of freedom of the code carrier relative to the sensor arrangement is ascertained on the basis of the code projection and is taken into account to determine the current measurement position, and a relative position of the connecting element with respect to the holder and/or the deformation thereof is determined from the position value in the form of a change in shape or size.

17 Claims, 6 Drawing Sheets

(56) References Cited

U.S. PATENT DOCUMENTS

| | | | |
|---|---|---|---|
| 5,035,503 A | 7/1991 | Sadeh et al. | |
| 5,402,582 A | 4/1995 | Raab | |
| 6,410,910 B1 | 6/2002 | Feichtinger | |
| 6,519,860 B1* | 2/2003 | Bieg | B23H 7/26 33/1 PT |
| 6,838,688 B2 | 1/2005 | Aoki | |
| 6,957,496 B2 | 10/2005 | Raab et al. | |
| 7,051,450 B2 | 5/2006 | Raab et al. | |
| 7,069,664 B2 | 7/2006 | Raab | |
| 7,345,597 B2 | 3/2008 | Koester | |
| 7,805,851 B2 | 10/2010 | Pettersson | |
| RE42,055 E | 1/2011 | Raab et al. | |
| 8,031,334 B2 | 10/2011 | Lippuner et al. | |
| 8,462,979 B2 | 6/2013 | Braunecker et al. | |
| 2005/0016008 A1* | 1/2005 | Raab | B23Q 35/04 33/503 |
| 2005/0166413 A1 | 8/2005 | Crampton | |
| 2006/0254364 A1* | 11/2006 | Matsushita | B25J 9/1692 73/760 |
| 2009/0165317 A1 | 7/2009 | Little | |
| 2010/0039656 A1* | 2/2010 | Lippuner | G01D 5/24452 356/616 |
| 2011/0315864 A1* | 12/2011 | Lippuner | G01D 5/3473 250/231.13 |

FOREIGN PATENT DOCUMENTS

| | | | |
|---|---|---|---|
| CN | 201322597 Y | 10/2009 | |
| DE | 199 07 326 A1 | 8/2000 | |
| DE | 101 33 266 A1 | 3/2002 | |
| EP | 1 250 986 A2 | 10/2002 | |
| EP | 1 474 650 A2 | 11/2004 | |
| EP | 1 632 754 A1 | 8/2006 | |
| EP | 1 744 127 A1 | 1/2007 | |
| EP | 1 944 582 A1 | 7/2008 | |
| EP | 2075096 A1 | 7/2009 | |
| EP | 1 654 514 B1 | 10/2010 | |
| WO | 2005/017447 A1 | 2/2005 | |
| WO | 2005/050134 A1 | 6/2005 | |
| WO | 2008019855 A1 | 2/2008 | |
| WO | WO-2008019876 A1 * | 2/2008 | G01D 5/3473 |
| WO | 2008-083797 A1 | 7/2008 | |

* cited by examiner

MEASUREMENT METHOD FOR A SURFACE-MEASURING MEASURING MACHINE

FIELD OF THE INVENTION

The invention relates to a measurement method for a surface-measuring machine, a connection arrangement, in particular a tilting or rotary connection, for a measuring machine, and coordinate measuring machine comprising an articulated arm.

BACKGROUND

Measurement methods and measuring machines, such as, for example, coordinate measuring apparatuses or machines, e.g. comprising an articulated arm, have been known for a long time. By way of example, these apparatuses are used for the measurement of object surfaces which is carried out with high accuracy, in particular in the manufacturing industry, for which the measurement and testing of workpiece surfaces are of great importance.

3D coordinate measuring articulated arms of the generic type are described in U.S. Pat. No. 5,402,582 or EP 1 474 650, for example. Comparable systems, also called "articulated arm" or "portable CMM", are offered e.g. by the company "Romer" with the product names "Sigma", "Flex" or "Omega" and the company "CimCore" with the product names "Infinite" or "Stinger".

3D coordinate measuring articulated arms have a base, which is positioned fixedly and in a known manner in a reference coordinate system, as one end of the articulated arm and an opposite movable measurement end, on which a measurement component or a measurement probe is arranged. A tactile probe can be used as a standard probe, which tactile probe can be brought into contact with a measurement point of an object surface and consists, for example, of a ruby sphere mounted on a measurement rod.

As an alternative thereto, optical sensors are also known as measurement components, which optical sensors can be embodied for example as point measuring devices or as scanners, i.e. as scanning an object surface continuously and e.g. line by line. More specifically, triangulation sensors or interferometric measurement arrangements can be used as such optical sensors. Furthermore, European Patent Application No. 07124101.2, for example, describes the use of a camera as measurement component which is designed for capturing or detecting a measurement object surface and is mounted on the movable end of an articulated arm. On the basis of the articulated arm coordinate measuring machine, it is possible to determine highly precisely a position and orientation of the camera in spatial terms.

Arranged between the two ends of the articulated arm there are a plurality of members or arm sections which are connected pivotably and/or rotatably with respect to one another and, if appropriate, displaceably with respect to one another, such that the measurement end with the measurement component, which is also designated as sensing member, is freely movable within a spatial section. For this purpose, the members of the arm are connected to one another by means of articulated joints and, if appropriate, by means of suspensions, which enable a linear displacement. Furthermore, position measuring devices are assigned to the articulated joints and/or suspensions, such that in each case a position or orientation of the members with respect to one another, that is to say a relative position in each case between the members, can be measured. By way of example, angle measuring devices and/or length measuring devices that determine lengths, rotational angles or pivoting angles as measurement variables are used for this purpose.

From the knowledge of an instantaneous measurement position of the members, i.e. of the respective relative positions of the members with respect to one another and of one of the members with respect to the base, it is possible to determine the orientation of the individual arm elements and of the measurement component relative to the base in a reference coordinate system. The position of the measurement component is generally determined by an evaluation unit to which these measurement variables measured by the respective position measuring devices are communicated and which derives the position of the measurement component therefrom. For example, computers or computing units specifically programmed for this application can be used for this purpose. By means of the reference—which can be ensured by means of the base—to the external reference coordinate system, it is possible to determine not only the orientation but also the position of the arm elements and of the measurement component, i.e. location and orientation in spatial terms.

In accordance with the generic type, the rotary articulated joints of an articulated arm are assigned in each case optoelectronic angle measuring devices that are used to determine in each case a relative rotational position of the two members connected by means of the articulated joint. The articulated joint generally consists of the two arm members connected rotatably to one another, between which a rotary encoder or angle measuring device is arranged. In this case, the optoelectronic angle measuring device or rotary encoder serves for measuring an instantaneous relative rotational position of its rotary bearing components with respect to one another, and thus indirectly of the two arm members. For this purpose, it has a code carrier or a code element, which is arranged on one of the two arm members, and a sensor arrangement, which is correspondingly fitted to the other arm member.

In this case, the code carrier is then mounted in the rotary articulated joint in such a way as to enable a relative rotational movement of the code carrier relative to the sensor arrangement about an axis of rotation. The element of the second articulated arm member that is rotatable with respect to the receptacle of a first arm member, the sensor arrangement and also the code carrier mounted rotatably therein with respect to one another of the sensor arrangement can in this case be designated as rotary bearing components.

In the case of such optoelectronic embodiments, pattern elements as code of the code carrier are optically imaged onto the sensor arrangement composed of one or a plurality of read heads, e.g. CCD or CMOS line or area sensors, as disclosed in CH 658514, for example. From the position of the code projection, in particular the projected pattern elements, on the sensor arrangement or the read heads thereof, it is possible to deduce the relative rotational angle of the code carrier as rotary body with respect to the sensor arrangement. In this case, a detector center serves as reference variable, wherein ideally both detector center, the pivot point, and the center of the pattern elements lie on the axis of rotation, without mechanical eccentricity errors.

By means of such methods and apparatuses, with corresponding precautions it is even possible, with a measurement accuracy of the order of magnitude of a few angular seconds, to resolve a complete circle into more than one million units.

In order to be able to achieve such high accuracies, firstly the sensor arrangement has to be arranged positionally stably with respect to the bearing. Secondly, a high dimensional and shape stability of the code carrier, in particular the arrangement and embodiment of the code element on the code carrier—with pattern elements arranged around a pattern center one behind another in the direction of rotation— is a necessary prerequisite. Besides partial graduation inaccuracies attributable to deviations of the predefined distances between individual pattern elements arranged one behind another and/or to deviations of the dimensions of the pattern elements themselves, in practice a spacing-apart of the pattern center from the axis of rotation, a so-called eccentricity, often makes it impossible to achieve required accuracies. On account of manufacturing tolerances that can be avoided only with difficulty and in practice always exist, each code carrier has an eccentricity. Radial runouts of the bearing or a bearing play can additionally make a contribution to the eccentricity. If appreciable loads owing to forces act on the rotary articulated joints of the articulated arm during the determination of the sensing position or the rotational angles, then permanent or temporary eccentricities and other changes in position of the code carrier with respect to the receptacle of the rotary articulated joint can likewise occur depending on the loads.

Methods and apparatuses for determining the rotational angle and calibrating out such undesirable changes in position with respect to the ideal position, for example owing to loads on the rotary articulated joint or owing to bearing faults and/or radial runouts, are described, inter alia, in European Patent Application No. 07100296.8 and the publications EP 1,632,754 A1, U.S. Pat. No. 7,051,450 B2 and U.S. Pat. No. 7,069,664 B2.

In this case, EP 1,632,754 A1 discloses a method for measuring the current eccentricity of a rotary encoder, wherein at least some of a multiplicity of pattern elements arranged around a pattern center are imaged by means of optical beams on an optical detector. The pattern elements are arranged on a code carrier, which is connected to the detector in a manner rotatable about the axis of rotation. Positions of the imaged pattern elements are resolved by means of the detector elements of one and the same detector. In a first step, effects of an eccentricity of the pattern center with respect to the axis on the determination of a rotational angle are determined computationally by means of resolved positions of at least one pattern element. In a second step, taking into account the effects determined, the rotational angle is determined accurately by means of the resolved positions of pattern elements arranged one behind another.

In a development of this method, in the first step, by means of an intermediate step, pattern elements arranged one behind another are combined to form at least two groups and at least two group positions are determined computationally by means of the resolved individual positions of the respectively combined pattern elements. Effects of the eccentricity on the determination of the rotational angle are then determined computationally by means of the at least two group positions determined. By means of the group positions determined, this can be effected with higher accuracy.

The International Patent Application WO 2008/083797 describes, for the purpose of determining an eccentricity error for a rotational angle about an axis on the basis of resolved positions of pattern elements projected onto a sensor arrangement, in a first step, for a multiplicity of measurements, computationally determining the eccentricity of the pattern center with respect to the detector center. In a second step, by means of aggregation, i.e. by means of combination and linkage, from the multiplicity of measured values at least one influencing variable can be separated or determined. Depending on the approach, the influencing variables are either determined or else suppressed, e.g. by averaging out. Influencing variables determined can then be used either algorithmically or else for direct correction of the eccentricity, e.g. for mechanical correction of the axial position by means of actuating elements or electronically by adaptation.

Furthermore, it is explained therein that—besides the influencing variables which lead to a direct eccentricity contribution in the plane of the sensor arrangement, such as e.g. the translational displacement of the bearing shaft—the movement in the direction of the axis of rotation can also be determined by means of suitable angle measuring heads. As a result of the change in distance of the code element with respect to the sensor arrangement, the projection scale of the code changes. This change in projection scale can be used as a measure of the change in distance or the position in an axial direction. If the distances with respect to the code disk as code element are determined for two detector elements, then the tilting of the axis can also be determined.

U.S. Pat. No. 7,051,450 B2 and U.S. Pat. No. 7,069,664 B2 describe a coordinate measuring machine (CMM) comprising an articulated arm having a plurality of rotary articulated joints between a base of the arm and a measurement component arranged on the other arm end. For measuring a measurement position of the measurement component, the rotary articulated joints are in each case assigned angle measuring devices comprising a sensor arrangement composed of at least two read heads and a code element arranged rotatably with respect to the two.

It is demonstrated in this case that the at least two read heads cooperate with one another in such a way as to reduce an error caused by loads of the rotary articulated joint during the rotational angle measurement.

By way of example, two read heads offset by 180° in a circumferential direction, three read heads offset by 120° in each case in a circumferential direction, or alternatively four read heads offset by 90° in each case in a circumferential direction are provided for this purpose.

As already indicated above, therefore, these methods and apparatuses in the prior art always provide for taking into account, eliminating, calibrating out or compensating for errors which influence the angle measurement, exclusively for the determination of the rotational angle. Errors taken into account include e.g. wobble errors owing to an inclination of the rotation axis, eccentricity errors owing to manufacturing tolerances or a bearing play, and further errors, caused for example by loads of the rotary articulated joint. A dedicated determination and quantification of the influencing variables and the further processing thereof outside the rotary encoder do not take place.

However, in the case of coordinate measuring machines comprising an articulated arm having rotary articulated joints, owing to the described error influences such as loads of the rotary articulated joints—over and above an erroneous determination of the angular position—further errors arise in the context of determining the measurement position of the measurement component. Specifically, in practice—over and above the rotation actually provided by the rotary articulated joint—further changes in position of the code carrier with respect to the receptacle occur, in particular axial displacements, radial displacements or tiltings, which can have various causes. Although they are minimal changes in position, these nevertheless lead to appreciable errors given the accuracies required in the meantime for the position determination.

SUMMARY

Therefore, one object of the invention is to provide an improved measurement method for a surface-measuring measuring machine, in particular for a coordinate measuring machine comprising an articulated arm having rotary or tilting articulated joints, for determining the measurement position of a measurement component.

A further object is to provide an improved coordinate measuring machine comprising an articulated arm having rotary articulated joints as connection arrangements.

In particular, in this case, with little hardware modification outlay on the part of the articulated arm, the intention is to make it possible to determine the measurement component measurement position with higher accuracy.

The measurement method according to the invention for a surface-measuring measuring machine, e.g. for a coordinate measuring machine comprising an articulated arm having rotary articulated joints for determining a measurement position of a measurement component, breaks away from methods in the prior art, in which it is always the case that only in the context of determining an angular position of the rotary or tilting articulated joint is provision made for taking into account or compensating for error influences—such as e.g. load-governed displacements or tilting of the axis of rotation—, wherein the arm members as connection elements from the base to the measurement component are regarded as influenced.

By contrast, according to the invention, such changes in position of the code carrier, mounted rotatably in a receptacle, of a rotary articulated joint with respect to the assigned sensor arrangement are explicitly determined and used as additional measurement variables, which describe the measurement position of the arm members of the articulated arm, for deriving the measurement position of the measurement component relative to a base. This means that a change in position of the two arm members connected by means of the rotary articulated joint—which change in position is caused by loads, for example, in the rotary or tilting articulated joint as connection arrangement and goes beyond a change in rotational position—is determined in terms of its extent and is taken into account when determining the relative position of the two arm members with respect to one another. Deformations or changes in size of components can likewise be deduced from these position values according to the invention.

The determination of the changes in position such as
 a displacement of the code carrier with respect to the sensor arrangement in a radial direction relative to the axis of rotation,
 a displacement of the code carrier with respect to the sensor arrangement in the direction of the axis of rotation and/or
 a tilting of the code carrier with respect to the receptacle,
or of position change magnitudes associated with said changes in position is effected on the basis of an optoelectronic position measuring device between the code carrier and the sensor arrangement, in particular on the basis of an optoelectronic angle measuring device already assigned to the rotary articulated joint anyway.

For this purpose, the position measuring device has a code, which is applied to one of the rotary articulated joint components—namely directly or via a dedicated component—, and a sensor arrangement composed of at least one read head. In this case, the sensor arrangement is arranged on the respective other rotary articulated joint component and detects a code projection generated on the basis of the code carrier. In this case, code projection should be understood to mean a projection of at least part of an optically detectable code possessed by the code element. In particular, the code carrier used can be a dedicated code disk connected to one of the articulated arm members. Alternatively, however, the code can also be situated directly on one of the arm members, such that this serves structurally as a code carrier.

Code carriers and sensor arrangements of the generic type, wherein the described changes in position of the code relative to the sensor arrangement can be determined on the basis of a read code projection, are sufficiently known from the prior art. However, these changes in position, in accordance with apparatuses and methods in the prior art, are used only for calibration and thus improvement of an angle measurement. In this case, however, the displacements or tilting derived from the code projection are not used for describing the three-dimensional relative position of the components of the rotary articulated joint with respect to one another. Consequently, in the context of previous measurement position determinations in the case of articulated arms the idealistic assumption that the rotary articulated joint allows exclusively a relative rotational movement of the rotary articulated joint components with respect to one another—that is to say a movement with one degree of freedom—is always taken as a basis.

According to the invention, now for the rotary encoder, on the basis of the code projection, a position value for at least one further degree of freedom of the code carrier relative to the sensor arrangement assigned thereto is determined and taken into account when determining the current measurement position of the measurement component or of the probe, wherein the position value is used to determine a relative position of the connection element with respect to the receptacle connected thereto or the deformation thereof. This means that, according to the invention, the changes in position of the code carrier which go beyond the rotation are related to the position or orientation and a possible deformation of a connection element of the measuring machine, e.g. of an arm element.

In this case, the determination of the measurement position can both be based also model-based approaches, in which the geometrical and material-dependent variables of the connection elements, such as e.g. their length and inherent weight or an external weight having an effect, are taken into account, and it is also possible to use a solution based on calibrations, in which solution known positions and orientations are assigned corresponding position values, which, for their part, can again supply a basis for a descriptive function or else can also be stored in look-up tables. By their nature these approaches can also be combined, however, e.g. by additional calibrations being effected in selected measurement positions on the basis of a modeling. Moreover, variables determined by other sensors, such as e.g. temperature sensors, can also be used supplementarily in the model.

By virtue of the use according to the invention of the determined changes in position for describing the exact relative position of the rotary encoder or connection arrangement components with respect to one another and thus as further measurement variables which specifying the relative position of the articulated arm members and are taken into account when calculating the measurement position of the probe relative to the base, with little hardware modification outlay on the part of the articulated arm it becomes possible to determine the measurement component measurement position with higher accuracy.

By way of example, according to the invention, an occurring tilting of the code carrier of a rotary articulated joint about the actual rotation axis is detected in terms of its extent and is taken into account directly as current relative measurement position of the members connected by means of the rotary articulated joint and is thus included in the determination of the measurement position of the probe.

In model-based approaches, depending on the embodiment of the connection element, the latter can be regarded as rigid or else as deformable within limits. Accordingly, any change can be regarded as occurring only in the articulated joint or the connection arrangement or else a change in the components is also considered. It is thus possible to model the fact that, depending on the arrangement of rotary encoder axis and axis of the connection element and with knowledge of the inherent weight of the connection element and depending on the orientation of adjacent connection elements or arm members, division into position-governed and deformation-governed portions is also effected. Thus, in the case of the fitting of the rotary encoder on the longitudinal axis of the connection element and the perpendicular position thereof, the flexure and thus deformation and also load-governed tilting of the code carrier with respect to the sensor arrangement are minimal, wherein opposite longitudinal displacements, i.e. translations in an axial direction, occur in a suspended and in a standing position of the arm member. Thus, deformations of the individual components of a measuring machine can also be identified and determined in terms of their effect.

Particularly in the case of exchangeable measurement components, by virtue of the different weights thereof, the connection arrangements can also be influenced in a correspondingly deviating manner, which influencing can be determined by the offset according to the invention.

In this case, it should also be taken into consideration that, in the case of the high-precision applications required here, thermally governed changes, such as e.g. length or radius changes, already cause effects on the measurement position, which effects can likewise be taken into consideration or identified by the approach according to the invention.

The sensor arrangement of the position measuring device can consist, in particular, of at least two read heads. By way of example, as sensor arrangement, two read heads are arranged in a manner offset by 90° in a circumferential direction or, alternatively, three read heads are arranged with an offset of 60° in each case. The read heads can in this case be embodied in a known manner e.g. as line sensors having a multiplicity of detector elements strung together.

As code element or code carrier it is possible to use, in particular, a code disk having an optically readable code, e.g. in the transmitted light method. In this case, the code can have a multiplicity of pattern elements arranged one behind another in a circumferential direction, wherein the totality of the pattern elements can represent both an incremental and an absolute code. Alternatively, however, the code can also be situated on a different carrier, e.g. on the end face of housing components, which can then be illuminated e.g. in the reflected light method.

Preferably, according to the invention, an optoelectronic rotary encoder such as is already present anyway in some rotary articulated joints of articulated arms from the prior art can be used as the position measuring device. In particular, however, also for the rotary articulated joint—in addition to the angle encoder embodied according to the prior art and assigned to the rotary articulated joint—a further rotary encoder or some other functionally similar form of the combination of code carrier and sensor arrangement can be provided as an optoelectronic position measuring device, wherein the latter serves specifically for detecting the changes in position of the code carrier relative to the sensor arrangement.

As already described above, in this case the following changes in position of the code carrier relative to the receptacle—and thus of a first arm member, representing the code carrier, relative to a second arm member, having the receptacle—are determined and taken into account when deriving the exact relative position of the members with respect to one another:
- a displacement of the code carrier with respect to the sensor arrangement in a—with respect to the axis of rotation—radial direction,
- a displacement of the code carrier with respect to the sensor arrangement in a—with respect to the axis of rotation—axial direction and/or
- a tilting of the code carrier relative to the sensor arrangement.

As position change variables linked therewith it is possible to determine for example
- a radial displacement direction (RR) and a radial displacement extent ($\Delta r$),
- an axial displacement extent ($\Delta h$) and
- a tilting direction and a tilting angle ($\Delta \kappa$).

The position change variables—alongside the further arm position measurement variables designating the measurement position of the arm members—are related to one another, from which the measurement position of the measurement component relative to the base is derived.

For this purpose, the coordinate measuring machine designed according to the invention has an evaluation unit, by means of which the arm position measurement variables detected by individual member position measuring devices—also including according to the invention the position change variables with respect to the at least one rotary articulated joint—are linked with one another and the measurement position of the measurement component is derived therefrom.

BRIEF DESCRIPTION OF THE DRAWINGS

The measurement method according to the invention and the connection arrangement according to the invention and a coordinate measuring machine according to the invention are described in greater detail purely by way of example below on the basis of concrete exemplary embodiments illustrated schematically in the drawings, further advantages of the invention also being discussed. In the figures, specifically.

DETAILED DESCRIPTION

Figure 1:
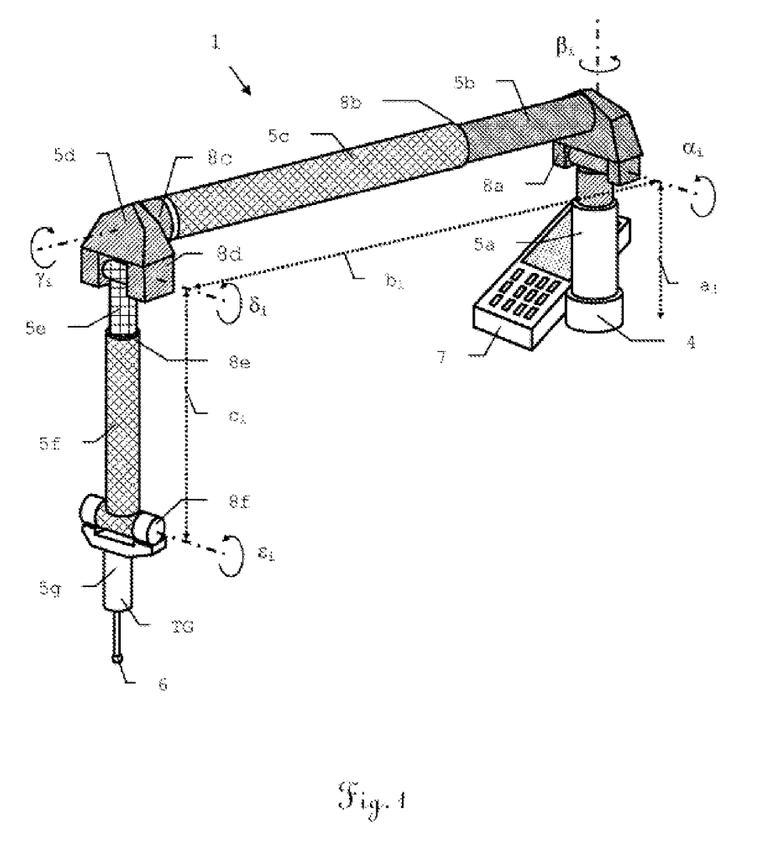
FIG. 1 shows a generic coordinate measuring machine with articulated arm having rotary and/or tilting articulated joints.

FIG. 1 shows purely by way of example a generic coordinate measuring machine 1 with articulated arm for determining the position of a measurement point as an example of a measuring machine for surface measurement. In this case, the coordinate measuring machine 1 has a base 4—which is positioned fixedly and in a known manner in a reference coordinate system. Proceeding from the base, successively by way of example seven arm members 5a-5g as connection elements are connected to one another via articulated joints enabling relative rotational movements and/or via suspensions enabling relative linear movements. For illustration reasons, i.e. for more comprehensible illustration, these articulated joints and suspensions are not shown explicitly visibly in FIG. 1, but generic articulated joints and suspensions are sufficiently known to the person skilled in the art anyway.

In this case, a first of the members 5a is fixed to the base 4 movably relative thereto, a second of the members 5b is fixed to the first member 5a movably relative thereto, etc. The seventh member 5g has a measurement component 6 and forms overall as structural element the sensing member TG. The measurement component 6 is thus freely movable within a spatial section and can e.g. be brought to a measurement position manually by a user, wherein the mechanical contact with base 4 is ensured by the sequence of connection elements. By way of example, the probe 6 is embodied as a ruby sphere for making contact with a point to be measured of an object surface, but contactlessly measuring systems can also be arranged and used in the same way. Alternatively, however, further measurement components known from the prior art can also be used instead of the tactile probe. Thus, by way of example, optical sensors—in particular an optical distance measuring device, e.g. interferometric measuring arrangements, a laser scanner or a camera for scanning the surface—can be used as measurement component.

By way of example, the coordinates of a reference point of the measurement component 6 and, in particular, additionally a current orientation of the measurement component 6 in the respective current measurement position are specified as measurement position.

In this case, for simpler differentiation, the members 5a-5g are illustrated with respectively alternately different hatching in FIG. 1. Base 4 and sensing member TG are shown without hatching.

A plurality of position measuring devices 8a-8f for measuring positions of the members 5a-5g in each case with respect to one another are assigned in each case to the articulated joints and/or suspensions. By way of example, as the position measuring devices 8a-8f, optoelectronic rotary encoders are provided as position measuring devices 8a, 8c, 8d, 8f and length measuring devices are provided as position measuring devices 8b, 8e, which are designed for measuring arm position measurement variables $\alpha$, $\beta$, $\gamma$, $\delta$, $\epsilon$, a, b, c linked with the relative position of the members. Consequently, angles $\alpha$, $\beta$, $\gamma$, $\delta$, $\epsilon$ and length deflections a, b, c between the members 5a-5g are therefore in each case measured as arm position measurement variables $\alpha$, $\beta$, $\gamma$, $\delta$, $\epsilon$, a, b, c.

In this case, an evaluation unit 7 is designed for receiving the arm position measurement variables $\alpha$, $\beta$, $\gamma$, $\delta$, $\epsilon$, a, b, c determined for a measurement position. On the basis of these arm position measurement variables $\alpha$, $\beta$, $\gamma$, $\delta$, $\epsilon$, a, b, c indicating the relative positions in each case of the arm members with respect to one another, the evaluation unit derives the measurement position or the coordinates of the measurement component 6 and displays said position or said coordinates e.g. on a display.

Figure 2:
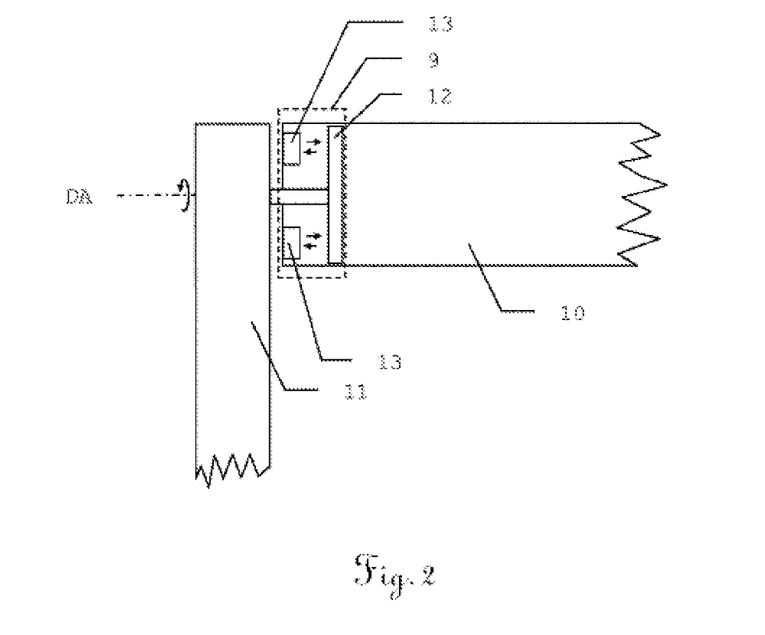
FIG. 2 shows a connection arrangement according to the invention of an articulated arm.

FIG. 2 shows a connection arrangement according to the invention, e.g. of an articulated arm, for use with a measurement method according to the invention, wherein the connection arrangement has a rotary encoder 9, which detects the rotation of the at least one connection element 10, e.g. a first arm member, with respect to a receptacle 11, e.g. as end of a second arm member. In this case, the measurement component is connected to the base indirectly by a sequence of connection elements 10, but according to the invention it is also possible to realize measuring machines with only a single connection element 10 and thus a direct connection of the measurement component to the base by this one connection element 10.

The rotary encoder 9 comprises in each case a code carrier 12 and a sensor arrangement 13, wherein code carrier 12 and sensor arrangement 13 are rotatable with respect to one another about a defined axis of rotation DA as a first degree of freedom. For this purpose, a code projection dependent on the three-dimensional position of the code carrier 12 relative to the sensor arrangement 13 is produced on the sensor arrangement 13 and at least part of the code projection is detected by said sensor arrangement. In this case, the rotary encoder 9 is constructed in a manner known per se from a code carrier 12 rigidly connected to the receptacle 11 and having an optically detectable code, which can be embodied, for example, as a code-carrying glass or plastic disk, and the sensor arrangement 13 consisting of one or more detector elements and serving for detecting the code projection, which can be correspondingly fitted in the connection element 10. For this purpose, the sensor arrangement 13 can have, for example, two read heads respectively having a line arrangement of optical detector elements. In FIGS. 2 to 6, the sensor arrangement 13 arranged in the connection element 10 consists, for example, of two read heads—e.g. such as are known according to the prior art. The code carrier 12 is assigned as code carrier with a code disk functioning as "measurement table" and having a code extending in a circumferential direction. In this case, the code can have a multiplicity of pattern elements arranged in a manner strung together, wherein the pattern elements are embodied—e.g. in triangular form—in such a way that the code projection is suitable, in particular, for the additional reading of changes in position in the non-rotation direction. The arrangement of the sensor arrangement 13 in the connection element 10 and the mechanically rigid connection of the code carrier 12 to the receptacle 11 constitute merely one example. In particular, this arrangement can also be reversed, i.e. according to the invention it is likewise possible to realize a mechanically rigid arrangement of the code carrier 12 in the connection element 10 and the mechanically rigid connection of the sensor arrangement 13 to the receptacle 11.

In addition to an angular position, according to the invention further positions of the first arm member with respect to the second arm member are taken into account when determining the relative measurement position, wherein the code carrier 12 embodied as a code disk serves as a "measurement table". That means that the three-dimensional position of the code disk relative to the sensor arrangement 13 is read, for example from a shadow casting of the code disk, wherein the code disk functions like a tabletop whose shadow produced on the floor by a ceiling light is dependent on its standpoint and its inclination relative to the floor. In this case, a modification of the hardware already present in coordinate measuring machines is necessary only to a limited extent. Thus, the position measuring device, in particular the rotary encoder 9, according to the invention now has to take account of the determined displacements and/or tilting of the code carrier in the non-rotation direction, which have a distorting effect on the angle measurement, not only rotary-encoder-internally during the angle determination, but as further measurement position variables in addition to the angular position determined to a superordinate evaluation unit, which calculates the measurement position for example from all measurement position variables of all member position measuring devices present in the articulated arm.

On the basis of the code projection, therefore, the rotational position of the code carrier 12 relative to the defined axis of rotation DA is determined and the current measurement position of the measurement component relative to the base is determined using this information available for all connection elements. For the rotary encoder 9, in contrast to solutions in the prior art, on the basis of the code projection a position value for at least one further degree of freedom of the code carrier 12 relative to the sensor arrangement 13 is also determined and taken into account when determining the current measurement position, wherein the position value is used to determine a relative position—corresponding to the further degree of freedom of the code carrier—of the connection element 10 with respect to the receptacle 11 and/or the deformation of said connection element. Although the angle measuring devices used in the prior art in some instances likewise determine lateral displacement or changes in distance of the code with respect to the detectors, they use this information only for increasing the accuracy in the angle measurement, i.e. in determining the rotational position. By contrast, according to the invention, the position value for the further degree of freedom is used to draw conclusions therefrom with regard to the position or orientation of the connection element 10 and, if appropriate, the forces acting or a deformation of the connection element 10, wherein position and/or orientation of the connection element correspond to the further degree of freedom of the code carrier 12. An eccentricity of the code carrier 12 is thus used to determine an eccentric position of the connection element 10 with respect to the receptacle 11, wherein deviations in the value of the variable describing the further degree of freedom can occur, however, on account of faults or changes in the relative positioning of code carrier 12 and connection element 10. Thus, in the case of a tilting of the code carrier 12, a corresponding tilting of the connection element 10 with respect to the receptacle 11 is deduced, wherein this tilting, e.g. on account of elastic influences, can also turn out to be larger or smaller than the value of the tilting of the code carrier 12. The degree of freedom of a tilting and/or of the rotation about the assigned tilting axis is taken into consideration in both cases, however.

As is described for example in the prior art documents cited above, the code projection can then be read and changes in position—caused by radial runout errors and loads of the rotary articulated joint—of the code element or code carrier 12 relative to the sensor arrangement 13—i.e. for example deviations of a code center from the axis of rotation DA—can be derived therefrom. In contrast to the use—known according to the prior art—of said changes in position of the code carrier 12 with respect to the sensor arrangement 13 merely for correcting an angle position to be determined of these two components with respect to one another, according to the invention said changes in position are taken into account as variables which indicates the relative position of connection element 10, e.g. in the case of an articulated arm of the first with respect to the second arm member, and are used as measurement position variables when calculating the position of the measurement component with respect to the base. Consequently, changes in position of the code carrier 12 with respect to the sensor arrangement 13 which go beyond an angle of rotation are also explicitly determined from the detected code projection and used for determining the measurement position. Although such displacements and tilting are substantially prevented by a corresponding, precise mounting of the code carrier 12, even minimal displacements and/or tilting affect the accuracy for determining the measurement position of the probe. Consequently, the changes in position, which, although undesirable in principle, cannot completely be avoided, are not only accepted but determined and used as information for describing the overall state of the mechanical system of the measuring machine. Consequently, firstly the change between the components assigned to the receptacle and thus to one arm member and the components of the connection element as the other arm member is determined, such that changes in the articulated joint or the connection arrangement can be quantified and taken into account. Secondly, the forces acting can be deduced from the extent of the change and the angular positions, such that weight-governed deformations of components or the connections thereof can be determined. Moreover, thermal or ageing-governed changes in the connection arrangement can also be detected and taken into account.

According to the invention, for this purpose at least one, but in particular all of the following changes in position or position values are determined:
  a displacement in a radial direction relative to the axis of rotation DA,
  a displacement in the direction of the axis of rotation DA and/or
  a tilting about the axis of rotation DA.

In particular, it is possible to determine the position values from the same code projection which also serves for reading the angular position of the code element relative to the sensor arrangement. According to the invention it is likewise possible for the position values determined furthermore also to be used for correction and/or calibration when determining the angular position.

FIGS. 3 to 6 show, by way of example, changes in position caused by loading of the rotary articulated joint in the non-rotation direction of the code carrier 12 with respect to the sensor arrangement 13.

Figure 3:
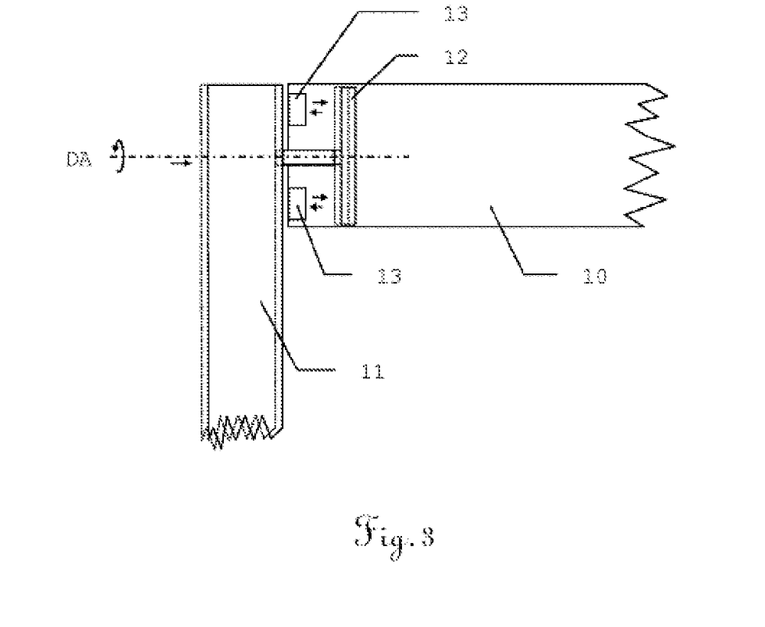
FIG. 3 shows the connection arrangement according to the invention from FIG. 4 with an illustrated axial displacement of the code carrier.

In FIG. 3, the code carrier 12 is displaced relative to the sensor arrangement 13 in the direction of the axis of rotation DA. Such a change in position can be derived from the code projection, e.g. from a scale change of the code projection detected by the sensor arrangement. The associated position change variable can subsequently be communicated as axial displacement extent (Δh) with regard to this rotary articulated joint to the evaluation unit.

Figure 4:
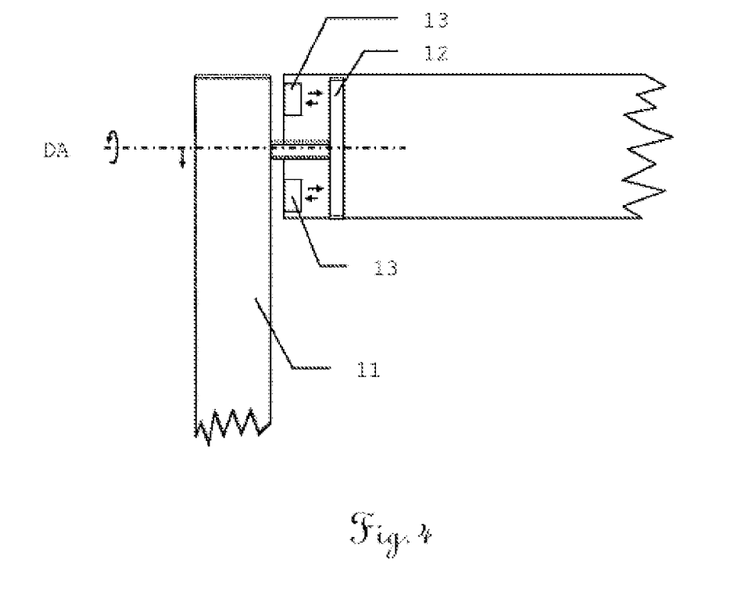
FIG. 4 shows the connection arrangement according to the invention from FIG. 4 with an illustrated radial displacement of the code carrier.

In FIG. 4, the code carrier 12 is displaced relative to the sensor arrangement 13 and with respect to the axis of rotation DA in a radial direction. Such a change in position can be derived from the code projection, e.g. on the basis of displacements of those positions of the pattern elements which are resolved by the sensor arrangement 13. The associated position change variables can subsequently be communicated as radial displacement direction (RR) and radial displacement extent (Δr) with regard to this rotary articulated joint to the evaluation unit.

Figure 5:
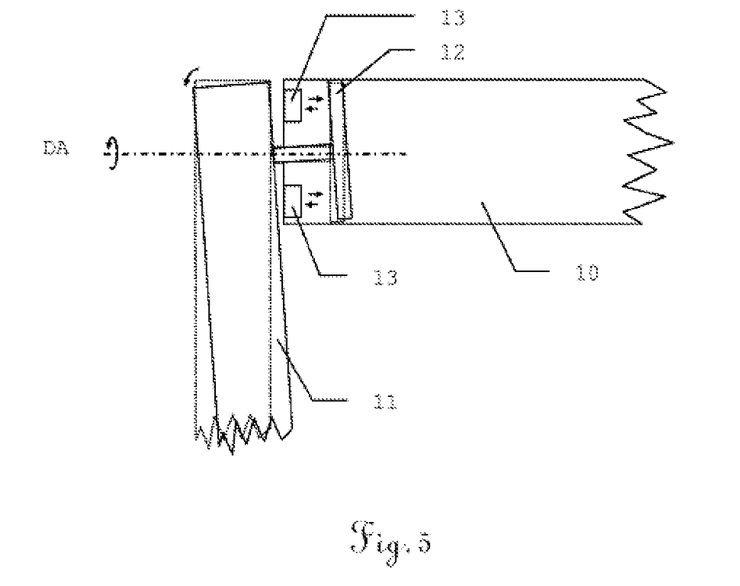
FIG. 5 shows the connection arrangement according to the invention from FIG. 4 with an illustrated tilting of the code carrier.

In FIG. 5, the code carrier 12 is tilted relative to the sensor arrangement 13 and with respect to the axis of rotation DA. Such a change in position can be derived from the code projection, e.g. from a scale ratio of the code projection detected by the first read head to the code projection detected by the second read head. The associated position change variables can be communicated e.g. as tilting direction and tilting angle (Δκ) with regard to this rotary articulated joint to the evaluation unit.

Figure 6:
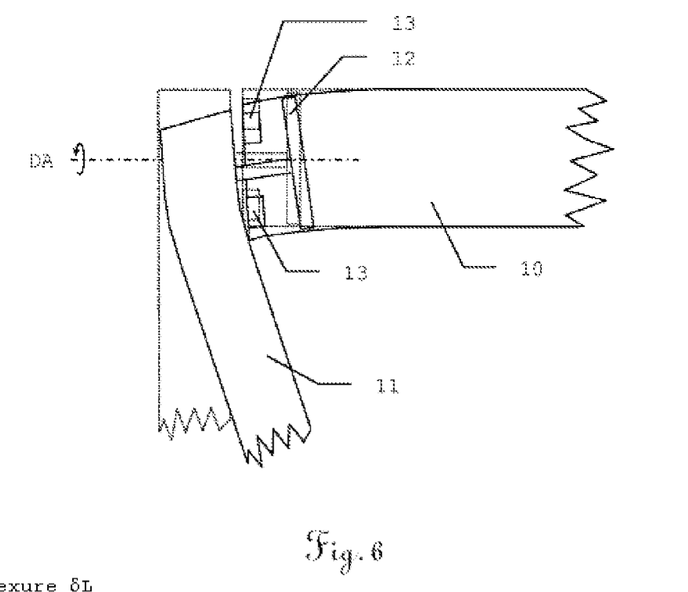
FIG. 6 shows the connection arrangement according to the invention from FIG. 4 with a tilting of the code carrier and with a flexure of the arm members.

As is illustrated in FIG. 6, it can happen that in addition to the tilting and, if appropriate, the pure weight-governed and slight deformation, going beyond that a flexure or deformation of the two arm members connected rotatably with respect to one another is also brought about, e.g. as a result of a higher loading on the rotary articulated joint. Such a loading can occur, for example, when particularly heavy measurement components are used, if such exchangeability of probes is provided. On the basis of empirical experiments and/or taking account of models or deformation parameters of the first and/or second arm member carried out calculations, flexures of the arm members can now be determined as further measurement position variables—depending on the tilting—and used for deriving the measurement position of the measurement component in a coordinate system spanned with respect to the measuring machine base.

In this case, it is assumed that an extent of the tilting determined can be used as a measure of a flexure of the arm members connected via the rotary articulated joint—by modeling and to a good approximation.

Figure 7:
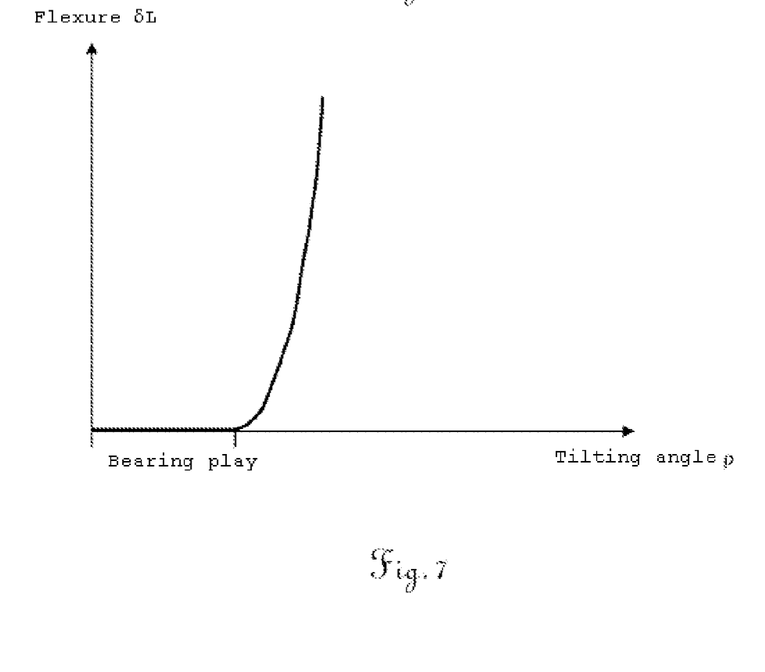
FIG. 7 shows the connection arrangement according to the invention with a further embodiment for a rotary encoder assigned thereto.

By way of example, for this purpose it is possible to establish a function of the flexure of one of the arm members depending on the tilting about the axis of rotation, which function is derived on the basis of deformation laws for solid bodies and/or defined by empirical experiments. One example of such a function is illustrated in FIG. 7, wherein an extent of the flexure δL of the corresponding arm member—purely schematically and in principle—is plotted against the tilting angle ρ determined. In this case, the function can be chosen in such a way that, up to a tilting angle predefined by a bearing play in the rotary articulated joint, the extent of the arm articulated joint flexure is set as equal to zero. In this tilting range, the forces acting on the arm members are transmitted, by the usually very stiff bodies of the arm members, substantially completely to the articulated joints, where they bring about for the time being precisely the tilting about the axis of rotation as carried out in the context of the rotary articulated joint play. If the code carrier has reached a stop in the rotary articulated joint as a result of a tilting, then a further exertion of force also brings about a deformation of the arm members substantially in the form of a flexure. Depending on the embodiment of the connection element, however, in this case it is also possible to model the above-described position- and weight-dependent deformation thereof.

Figure 8:
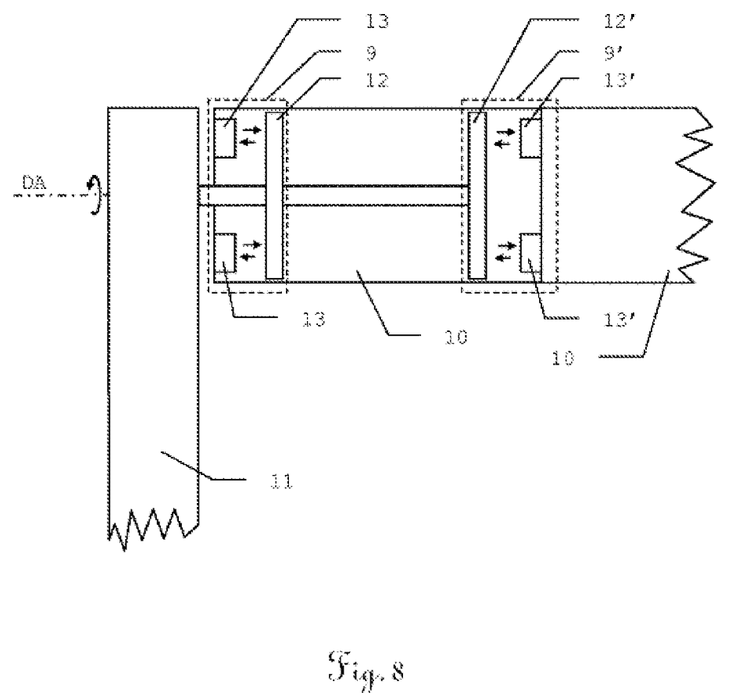
FIG. 8 shows a code projection onto a sensor arrangement, which code projection is suitable for reading displacements and/or tilting of the code carrier with respect to the receptacle.

FIG. 8 illustrates an alternative embodiment according to the invention for a connection arrangement in the form of a rotary articulated joint having two rotary encoders 9 and 9'.

In this case, the rotary articulated joint is assigned a first rotary encoder 9 and a second rotary encoder 9', in which the two optically detectable code disks as first and second code carriers 12 and 12' are arranged at a distance from one another on a common axis as axis of rotation DA. The two code disks are respectively assigned a sensor arrangement 13 and 13' composed of at least two read heads, wherein the sensor arrangements and 13' in each case detect a code element projection and are arranged opposite each other in the connection element 10.

Such an arrangement as angle measuring device and additionally as a measuring instrument for axial and/or radial displacements and/or tilting of the code carrier makes it possible to determine highly precisely the exact three-dimensional position of the code carriers 12 and 12' with respect to the sensor arrangements 13 and 13'. This exactly determined position, which is detected on the basis of measurement position variables such as an angle of rotation about the axis of rotation, a radial displacement direction, a radial displacement extent, an axial displacement extent, a tilting direction and/or a tilting angle, can indeed be related taking account of the rigid coupling of the code carriers 12 and 12' on the one hand, and of the sensor arrangements 13 and 13', on the other hand, with respect to one another. Thus, extension and change in length of the common axis or of the housing of the connection element can be identified and quantitatively determined on the basis of the change in distance of the code carriers 12 and 12' relative to the respective sensor arrangements 13 and 13'. Likewise, in the case of an axis assumed to be rigid and oppositely directed tilting of code carrier 12, 12' and sensor arrangements 13, 13' in the rotary encoders 9 and 9', it is possible to deduce a flexure of the connection element 10. In the case of an equidirectional tilting, by contrast, it is possible to deduce a largely rigid behavior of the connection element 10 and the total movement thereof.

According to the invention, it is possible, in particular, to substantially or completely replace other sensors in measuring machines, e.g. pure length-measuring sensors, such that a complete and highly precise determination of the measurement position or spatial position of the measurement component becomes possible solely by the use of uniformly constructed rotary encoders. By virtue of the fact that this makes it possible to exclusively use a single type of sensor, the mechanical and electronic construction can be simplified. In particular, in an articulated arm, a plurality or else each of the connection arrangements between the arm members can be embodied with in each case two rotary encoders arranged on a common axis of rotation, such that besides the relative position of the connection element with respect to its receptacle, it is possible in each case also to determine deformations as deviation from the desired form, i.e. both deformations and scale changes, such as e.g. increase or decrease of length or diameter. Consequently, it is also possible to determine the relative spatial position of all components with respect to one another exclusively by means of rotary encoders, wherein further sensors can supplementarily be used, which, however, do not directly measure the spatial position but rather provide additional parameters, such as temperature sensors, for example, which allow a conclusion to be drawn about the temperature-governed deformation of the components.

Figure 9:
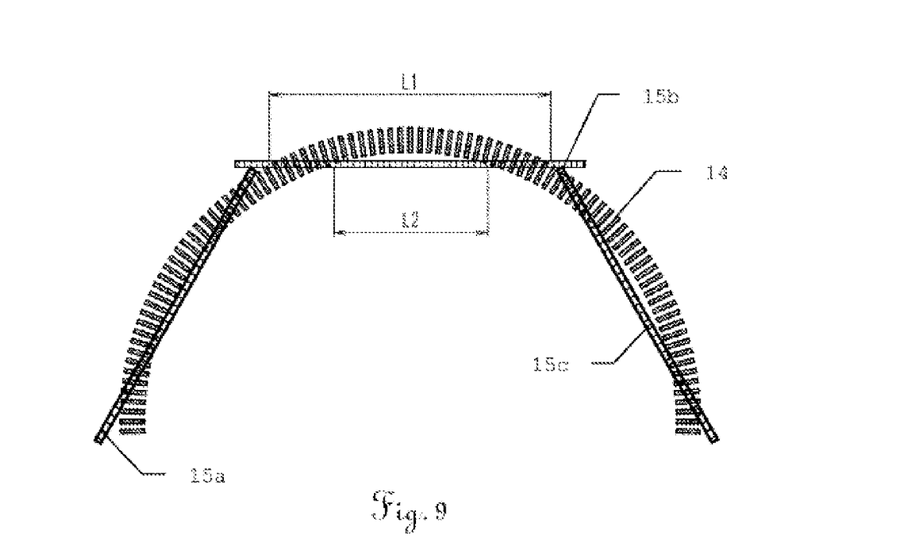
FIG. 9 shows a code projection suitable for reading displacements and/or tilting of the code carrier with respect to the sensor arrangement.

FIG. 9 illustrates an example of a code projection onto a sensor arrangement composed of three sensor lines 15a-c offset by 60°, said projection being produced by a code carrier as code carrier having pattern elements 14 arranged in a circumferential direction. By resolving positions of the projected pattern elements 14 on the sensor lines 15a-c, it is possible, in a manner known per se, to determine both the rotational angle position and the already explained further changes in position of the code carrier relative to the sensor arrangement thus of the connection element with respect to the receptacle.

The pattern of the code carrier, which pattern is embodied as a bar pattern, for example, has a multiplicity of pattern elements 14 arranged around a pattern center one behind another in the direction of rotation at the same distance with respect to one another, said pattern elements being embodied e.g. as light-opaque bars oriented radially. By means of beams passing through between the bars, a portion of the bar pattern is imaged as bright and dark regions on the light-sensitive detector elements.

Moreover, the outwardly and the inwardly directed end sides of the bars form two concentric, discontinuous circle lines that embody patterns which are symmetrical with respect to the pattern center. By means of the sensor lines 15a-c as detector elements, it is possible here, in particular during a rotation of the bar pattern, to resolve the lengths L1 and L2 of the entrances and exits of the respective bars into and out of the spatially resolving region. With the positions resolved in this way, for example a radial displacement and/or a tilting can then be determined computationally. In principle, the position value can be determined computationally on the basis of a position of at least one of the pattern elements 14, a ratio of positions of a plurality of the pattern elements 14 with respect to one another, or a sequence of positions of a plurality of pattern elements 14 arranged one behind another. In this case, the code or the code projection onto the sensor arrangement can also be designed in a redundant manner, i.e. as overdetermined with regard to the variable to be determined, such that the additional information available as a result of the redundancy can be used.

Figure 10:
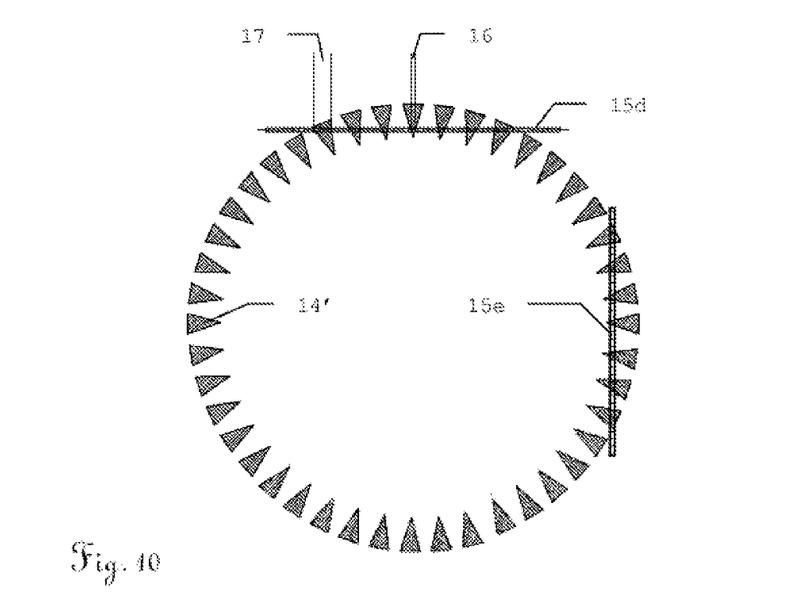
FIG. 10 shows a further code projection suitable for reading displacements and/or tilting of the code carrier with respect to the sensor arrangement.

FIG. 10 shows an exemplary embodiment which differs from the exemplary embodiment shown in FIG. 9 by virtue of two sensor lines 5d and 5e offset by 90° as a sensor arrangement and by virtue of a different embodiment of the pattern, in particular of the pattern elements 14' oriented radially toward the pattern center and arranged one behind another in the direction of rotation. The code carrier is embodied here by a light-transmissive glass disk with light-opaque triangles. However, the code carrier rotatable about the axis could also be embodied, for example, in the form of a thin metal disk having in this case triangular cutouts that embody the pattern elements 14' arranged one behind another in the direction of rotation.

The—for example triangular—embodiment of the pattern elements 14', wherein mutually facing side lines of adjacent pattern elements 14' arranged one behind another are embodied in a manner essentially inclined with respect to the radial direction, has, as a result of the additional inclination with respect to the radial direction, a greater sensitivity with regard to determining displacements or tilting of the code carrier by means of the spatially resolving region. It even makes it possible to determine such changes in position of the code carrier by means of resolving the width of a single triangle, which is represented here for the two widths 16 and 17 of the region projected onto the sensor line 15d. Thus, by way of example, from the width 16 of the projection, the position or the displacement thereof in here a radial direction can be identified and its extent can be determined. It goes without saying that it is also possible to determine such changes in position by means of the distances between the triangles. As a result here of the triangular form of the pattern elements directed in the direction of the pattern center, it is possible here by contrast—in comparison with rectangular pattern elements—to provide fewer pattern elements arranged one behind another, as a result of which a smaller resolution can be obtained.

However, the sensor arrangement of the rotary encoder can have, in principle and in a manner dependent on code configuration and accuracy requirements, either one or else two or more read heads or sensor lines, wherein, in principle, besides sensor lines as linear arrays, it is also possible to use area sensors, i.e. two-dimensional arrangements of pixel sensors. In the case of two or more read heads, the latter can be arranged e.g. in a manner offset with respect to one another 180° in a circumferential direction, wherein said read heads, in the case of four thereof, can be arranged in a manner offset by 90° in each case in a circumferential direction. In the case of three read heads, the latter can be arranged in a manner offset by 120° in each case. Besides dividing the arrangement with identical angular separations between the read heads or sensor components, however, it is possible to realize sensor arrangements of the rotary encoder having at least four read heads, for example, which are arranged in a manner offset with respect to one another at different angles in a circumferential direction, such that e.g. all angular separations differ from one another, in particular are in no ratio of multiples with respect to one another.

Likewise, it is also possible to use for example a, in particular a single, area sensor, which is arranged on the axis of rotation or detects the latter and an adjacent region and thus covers a large angular range in the region in proximity to the axis or else the full angular range. In particular, in the case of a code carrier, code patterns can also be fitted on two opposite end faces, said code patterns in turn being respectively assigned an area sensor covering the axis of rotation. Such arrangements comprising areal codes that are detected by a corresponding sensor are known from WO 2008/019855, for example.

It goes without saying that these illustrated figures merely schematically illustrate examples of possible embodiments.

What is claimed is:

1. A method for determining a measurement position of a surface-measuring measuring machine measuring a surface, the surface-measuring measuring machine comprising:
   a base;
   a measurement component for producing and maintaining a contact-making or contactless measurement connection to the surface to be measured, wherein the measurement component is connected to the base by at least one connection element;
   at least one rotary encoder, which detects a rotation of the at least one connection element with respect to a receptacle and in each case has a code carrier and a sensor arrangement, wherein code carrier and sensor arrangement are rotatable with respect to one another about a defined axis of rotation as a first degree of freedom, wherein on the basis of a code projection on the sensor arrangement, said code projection being dependent on the three-dimensional position of the code carrier relative to the sensor arrangement, a rotational position relative to the defined axis of rotation and a position value for at least one further degree of freedom of the code carrier relative to the sensor arrangement for the at least one rotary encoder are determinable, wherein the position value is usable to determine a relative position of the connection element with respect to the receptacle; and an evaluation unit;

wherein the method comprises:

determining with the evaluation unit a measurement position of the measurement component relative to the base using the rotational position of the at least one rotary encoder and the relative position, wherein the rotary encoder has at least two code carriers, which are rotatable about the same axis of rotation and are arranged at a distance from one another in a direction of the axis of rotation, and a position value is determined for each of the two code carriers on the basis of the respective code projection, wherein the combination of the position values of the two code carriers is used to determine a relative position of the connection element with respect to the receptacle, therein determine a change in length of the common axis or of a housing of the connection element and/or a flexure and/or a total movement of the connection element.

2. The method as claimed in claim 1, wherein:
a deflection of the code carrier from a rest position in a radial direction relative to the axis of rotation; and/or
a deflection of the code carrier from a rest position in the direction of the axis of rotation; and/or
a tilting of the code carrier from a rest position relative to the sensor arrangement are/is determined as the position value.

3. The method as claimed in claim 1, wherein rotational position, deflection and tilting and thus the position of the code carrier relative to the sensor arrangement in six degrees of freedom are determined for the at least one rotary encoder.

4. The method as claimed in claim 1, wherein for the at least one rotary encoder a division into deformation- and relative-position-governed portions is effected on the basis of the orientation of a further connection element connected to the receptacle.

5. The method as claimed in claim 1, wherein for at least one second rotary encoder the rotational position thereof and the position value thereof are determined and taken into account when determining a spatial position of the measurement component.

6. The method as claimed in claim 5, wherein the measurement position is determined on the basis of the spatial position of the connection elements, said spatial position being derived exclusively by means of the rotational positions and position values of the at least two rotary encoders.

7. The method as claimed in claim 1, wherein the determined relative position corresponds to the further degree of freedom of the code carrier.

8. The method as claimed in claim 1, wherein the contactless measurement connection to the surface to be measured is an optical contactless measurement connection to the surface to be measured.

9. A coordinate measuring machine comprising an articulated arm for determining a measurement position, wherein the articulated arm has at least a first end as base and a second end having a measurement component for producing and maintaining a contact-connecting or contactless measurement connection to a surface to be measured, wherein the coordinate measuring machine is configured to determine the measurement position as in the method according to claim 1.

10. A measurement method for a surface-measuring measuring machine, comprising:

a base;

a measurement component for producing and maintaining a contact-making or contactless measurement connection to a surface to be measured, wherein the measurement component is connected to the base by at least one connection element;

at least one rotary encoder, which detects a rotation of the at least one connection element with respect to a receptacle and in each case has a code carrier and a sensor arrangement, wherein code carrier and sensor arrangement are rotatable with respect to one another about a defined axis of rotation as a first degree of freedom; and an evaluation unit;

wherein the method comprises:

generating a code projection on the sensor arrangement, said code projection being dependent on the three-dimensional position of the code carrier relative to the sensor arrangement, and detecting at least part of the code projection;

determining with the rotary encoder a rotational position relative to the defined axis of rotation of the code carrier on the basis of the code projection;

determining a position value for at least one further degree of freedom of the code carrier relative to the sensor arrangement for the at least one rotary encoder on the basis of the code projection, and using the position value to determine a relative position of the connection element with respect to the receptacle;

determining with the evaluation unit a current measurement position of the measurement component relative to the base using the rotational position of the at least one rotary encoder and the relative position, wherein the rotary encoder has at least two code carriers, which are rotatable about the same axis of rotation and are arranged at a distance from one another in a direction of the axis of rotation, and a position value is determined for each of the code carriers on the basis of the respective code projection, wherein the combination of the position values of the two code carriers is used to determine a relative position of the connection element with respect to the receptacle, therein to determine a change in length of the common axis or of a housing of the connection element and/or a flexure and/or a total movement of the connection element.

11. The method as claimed in claim 10, wherein:
a deflection of the code carrier from a rest position in a radial direction relative to the axis of rotation; and/or
a deflection of the code carrier from a rest position in the direction of the axis of rotation; and/or
a tilting of the code carrier from a rest position relative to the sensor arrangement are/is determined as the position value.

12. The method as claimed in claim 10, wherein rotational position, deflection and tilting and thus the position of the code carrier relative to the sensor arrangement in six degrees of freedom are determined for the at least one rotary encoder.

13. The method as claimed in claim 10, wherein for the at least one rotary encoder a division into deformation- and relative-position-governed portions is effected on the basis of the orientation of a further connection element connected to the receptacle.

14. The method as claimed in claim 10, wherein for at least one second rotary encoder the rotational position thereof and the position value thereof are determined and taken into account when determining a spatial position of the measurement component.

15. The method as claimed in claim 14, wherein the measurement position is determined on the basis of the spatial position of the connection elements, said spatial position being derived exclusively by means of the rotational positions and position values of the at least two rotary encoders.

16. The method as claimed in claim 10, wherein the determined relative position corresponds to the further degree of freedom of the code carrier.

17. The method as claimed in claim 10, wherein the contactless measurement connection to the surface to be measured is an optical contactless measurement connection to the surface to be measured.

\* \* \* \* \*